R. W. SCHMIDT.
METHOD OF PRODUCING ORNAMENTAL ARTICLES.
APPLICATION FILED MAR. 19, 1920.
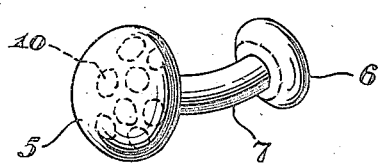
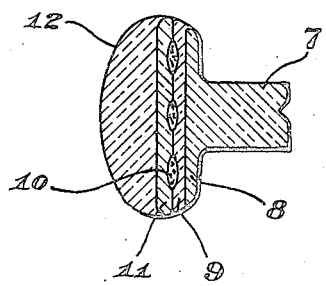

UNITED STATES PATENT OFFICE.

ROBERT WM. SCHMIDT, OF CHICAGO, ILLINOIS.

METHOD OF PRODUCING ORNAMENTAL ARTICLES.

1,403,268.

Specification of Letters Patent. Patented Jan. 10, 1922.

Application filed March 19, 1920. Serial No. 367,259.

*To all whom it may concern:*

Be it known that I, ROBERT W. SCHMIDT, a citizen of the United States, residing at Chicago, in the county of Cook and State of Illinois, have invented new and useful Improvements in Methods of Producing Ornamental Articles, of which the following is a specification.

This invention relates to a method for producing ornamental articles such as cuff-buttons, hat pins, scarf pins, etc., the button or head of such article being composed of glass which is given a pleasing ornamental effect.

The invention has for its object to place the ornament or design under a transparent body, and so unite said parts by fusing, as to produce an integral structure.

In order that the invention may be better understood, reference is had to the accompanying drawing forming a part of this specification, and in said drawing, Figure 1 is a perspective view of a cuff-button produced by the method, and Fig. 2 is an enlarged sectional detail.

Referring specifically to the drawing, 5 and 6 denote the two heads of a cuff button which are connected by a shank 7. These parts are all made of glass, and the heads are made ornamental by the method which is the subject matter of the present application for patent. The drawing illustrates a cuff button, but the method may also be employed for producing other articles.

In carrying out the method, the shank 7 is heated at its ends to a fusing temperature, and said ends are spread to produce the bases 8 of the button heads. A layer 9 of colored glass is next spread on the base 8, and before this layer begins to harden, small pieces 10 of gold stone are laid and sunk into the surface of said layer. A layer 11 of white glass in a plastic state is then spread over the layer 9 to completely cover and embed the ornamental pieces 10, said layer being applied with pressure so that it is thoroughly united to the layer 9, care being taken to prevent the formation of air pockets in the mass as this would spoil the article, because when it is heated the air bubbles would cause the glass to burst. A mass 12 of clear glass in a plastic state is now applied on top of the layer 11 and shaped to form the body of the button head and the transparent facing of the ornamental pieces 10, the entire article being re-heated to fuse the several layers together into one solid integral mass.

The gold-stone employed as the ornamental element is an artificial product composed of a glass like body spangled with particles of shining metal. This product can be readily reduced to a flake-like consistency for application to the layer 9, and it fuses readily to unite with said layer and the layer 11, and to expose its glittering particles.

Where the method is employed to produce the jewel of a scarf pin or any other article without a stem or shank, the base for the ornamental element is correspondingly fashioned.

I claim:

The method of producing an ornamental glass article, consisting in producing a glass base, applying to the face of said base a layer of colored glass in a plastic state, applying a glittering substance to said layer to unite therewith before it sets, covering said substance with a layer of glass in a plastic state, applying to said covering layer a mass of glass in a plastic state and shaping the same to form the body of the article, and heating the whole to unite its constituent parts into a single integral mass.

In testimony whereof I affix my signature.

ROBERT WM. SCHMIDT.